US00RE34435E

United States Patent [19]

Warren et al.

[11] E Patent Number: Re. 34,435

[45] Reissued Date of Patent: Nov. 9, 1993

[54] WHIRL RESISTANT BIT

[75] Inventors: Tommy M. Warren, Coweta; J. Ford Brett, Tulsa, both of Okla.

[73] Assignee: Amoco Corporation, Chicago, Ill.

[21] Appl. No.: 897,623

[22] Filed: Jun. 11, 1992

Related U.S. Patent Documents

Reissue of:

[64] Patent No.: 4,932,484
Issued: Jun. 12, 1990
Appl. No.: 335,398
Filed: Apr. 10, 1989

[51] Int. Cl.[5] ..... E21B 10/26; E21B 10/46; E21B 10/48

[52] U.S. Cl. ..... 175/398; 175/428; 175/431; 175/434; 175/403

[58] Field of Search ..... 175/431, 426, 428, 434, 175/385, 398, 408, 327, 376, 378, 402–404, 405.1, 387

[56] References Cited

U.S. PATENT DOCUMENTS

| | | | |
|---|---|---|---|
| 1,897,588 | 2/1933 | Reed | 175/378 |
| 2,244,537 | 6/1941 | Kammerer | 175/404 |
| 4,186,628 | 2/1980 | Bonnice | 76/108.1 |
| 4,359,112 | 11/1982 | Garner et al. | 175/421 |
| 4,440,247 | 4/1984 | Sartor | 175/393 |
| 4,471,845 | 9/1984 | Jürgens | 175/410 |
| 4,545,441 | 10/1985 | Williamson | 175/329 |
| 4,593,777 | 6/1986 | Barr | 175/410 |
| 4,660,659 | 4/1987 | Short, Jr. et al. | 175/329 |
| 4,673,044 | 6/1987 | Bigelow et al. | 175/410 |
| 4,907,662 | 3/1990 | Deane et al. | 175/431 |

FOREIGN PATENT DOCUMENTS 0395559 8/1973 U.S.S.R. .

OTHER PUBLICATIONS

Hough, "The Effect of Back Rake Angle on the Performance of Small-Diameter PCD Bits: ANOVA Tests", JERT, Dec. 1986, vol. 108/305.

*Primary Examiner*—Stephen J. Novosad
*Attorney, Agent, or Firm*—James A. Gabala; Richard A. Kretchmer; Frank J. Sroka

[57] ABSTRACT

A whirl resistant drill bit is disclosed for use in rotary drilling. The drill bit includes a generally cylindrical bit body with a plurality of cutting elements extending out from a lower end surface. The cutter elements are grouped in sets such that a first set of cutters are disposed at substantially an equal radius from a center of the bit body to create a groove in the material being drilled. A second set of cutters is connected to the lower end surface with each cutter therein in overlapping radial relationship with each other and extending a maximum distance from the lower end surface less than that of the first set of cutters. At least one cutter of the second set is in overlapping radial relationship with at least one of the cutters within the first set of cutters. This cutter arrangement causes the drill bit to cut grooves within the formation material that tends to prevent destructive bit whirl. Further, adjustments can be made to vary the back rake angle and side rake angle to prevent bit whirl.

11 Claims, 4 Drawing Sheets

WHIRL RESISTANT BIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to drill bits used to create boreholes through a material and, more particularly, to such drill bits that are used in the exploration for subterranean hydrocarbon deposits.

2. Setting of the Invention

In the exploration for subterranean hydrocarbon deposits, a rotating drill bit is used to create a borehole through the earth's subsurface formations. The users of such drill bits and drill bit manufacturers have found that by more precisely controlling the weight-on-bit (WOB) and increasing the rotational speed (RPM) that highly desirable increased drill bit penetration rates can be achieved. However, as the RPM is increased the effective life of the drill bits has decreased dramatically because the cutting elements on the drill bits become very quickly cracked and can be violently torn from the drill bits.

Numerous studies have been made to find out what causes such destruction to the cutting elements. The inventors hereof have previously found that a substantial portion of the destructive forces are generated by radial imbalance forces that cause a drill bit to rotate about a rotational axis offset from the geometric center of the drill bit in such a way that the drill bit tends to wobble or "backwards whirl" about the borehole. This backwards whirling causes the center of rotation to change dramatically as the drill bit rotates about the borehole. Thus, the cutting elements travel faster, sideways, and backwards and thus are subject to greatly increased impact loads which cause the destruction of the cutting elements.

More specifically, circumferential drilling imbalance forces exist to some degree on every drill bit and these forces tend to push the drill bit towards the side of the borehole. In a typical drill bit, gauge cutting elements are designed to cut the edge of the borehole. During the cutting process, the effective friction between the cutting elements near the gauge area increase and, thus, the instantaneous center of rotation becomes some point other than the geometric center of the drill bit. When this happens, the usual result is for the drill bit to begin to backwards whirl around the borehole. This whirling process regenerates itself because sufficient friction is always generated between the drill bit gauge area and the borehole wall, no matter what the orientation of the drill bit, from the centrifugal forces generated by the rapid acceleration of the drill bit.

Various methods and equipment have been proposed to eliminate or reduce these imbalance forces, including using dynamically balanced lower drillstring assemblies and very precisely aligning the cutting elements to reduce imbalance forces.

Various designs of drill bits have been developed to improve penetration rates by aligning the cutting elements in a plurality of equal radius sets, with each set being in overlapping radial relationship. One such drill bit design is disclosed in U.S. Pat. No. 4,545,441. Further, various attempts at improving cutting element life have been made by varying the back or side rake or angle of attack of the cutting elements, i.e., the angle at which the face of the cutting element addresses the formation with respect to the formation surface. The benefits of varying such back rake angles are disclosed in "The Effect Of Back Rake On The Performance Of Small-Diameter Polycrystalline Diamond Rock Bits: ANOVA Tests," Journal of Energy Resources Technology, Vol. 108, No. 4, pp. 305-309, December 1986; U.S. Pat. No. 4,660,659; U.S. Pat. No. 4,440,247; U.S. Pat. No. 4,186,628 and U.S.S.R. Pat. No. 395,559. The effects of varying side rake angles is disclosed in Hunnj SPE-10152 (1981).

There is no disclosure or suggestion in any of the above-identified article or patents of arranging cutting elements specifically to prevent or reduce the effects of destructive bit whirl. There is a need for a drill bit design which incorporates features designed specifically for preventing bit whirl and improving cutting element life.

SUMMARY OF THE INVENTION

The present invention has been contemplated to overcome the foregoing deficiencies and meet the above-described needs. Specifically, the present invention is a drill bit for use in rotary drilling which includes a generally cylindrical bit body having an upper end interconnectable to a source of rotary motion, and having a lower end surface, which is generally curved. A plurality of cutting elements extend outward from the lower end surface and include at least one set of cutting elements (herein referred to as the first set) disposed at substantially equal radius from the center axis of the bit body and displaced beyond the depth profile of the remaining cutters (referred to as the second set). The first set of cutters extends a maximum distance x out from the lower end surface. Other cutting elements, at least two, are also included in overlapping radial relationships with each other and extend a maximum distance y out from the lower end surface, wherein $x > y$. At least one of these other cutting elements is in overlapping radial relationship with at least one of the cutting elements within the first set.

Because the first set of cutting elements extends a greater distance outward from the face of the drill bit, the first set of cutting elements creates a groove in the formation material. The cutting elements riding in this resulting groove help prevent the drill bit from wobbling or whirling about the borehole, because any time the drill bit tends to move away from the borehole center, cutters on the opposite side of the groove exert an increasing force that causes the drill bit to remain centered around the groove. Other sets of cutting elements remove the remaining material beside the groove thereby cutting all the formation material across the surface of the drill bit to create the borehole. Because the drill bit incorporates specific features to resist bit whirl, the drilling performance and cutting element life is improved over prior drill bits.

DETAILED DESCRIPTION OF THE PREFERRED EMBODIMENT

As stated previously, the present invention is a drill bit for use in rotary drilling that includes a generally cylindrical bit body for interconnection to a source of rotary motion. A plurality of cutting elements extend outward from a lower end surface of the bit body to create at least one groove in the formation material, which helps prevent the drill bit from whirling or wobbling about the borehole.

Figure 1A:
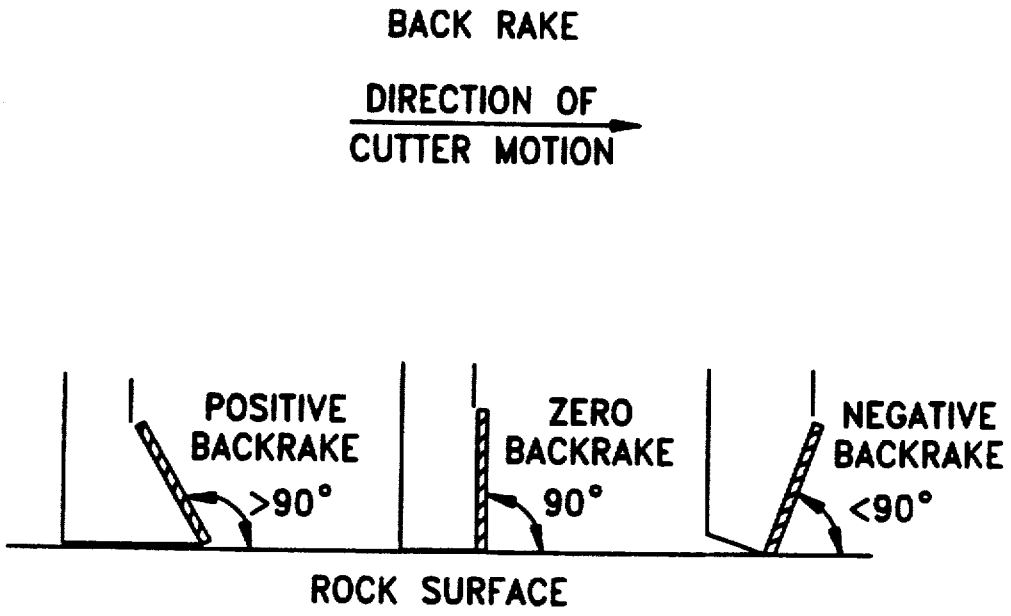
FIG. 1 is a schematic view of cutter arrangements showing both positive and negative back rake (side view) and side rake (plan view) for definitional purposes.
Figure 1B:
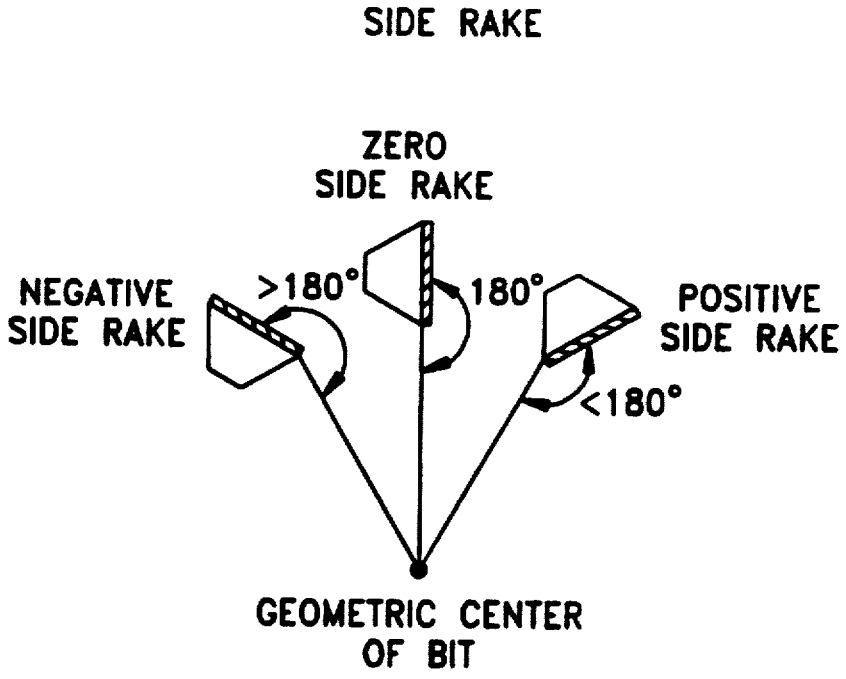

Before a detailed discussion of the novel features of the present invention, attention is directed for definitional purposes to FIG. 1 wherein in a side view cutting elements are shown having varying angles of back rake, and in a plan view, cutting elements are shown having varying angles of side rake.

Figure 2:
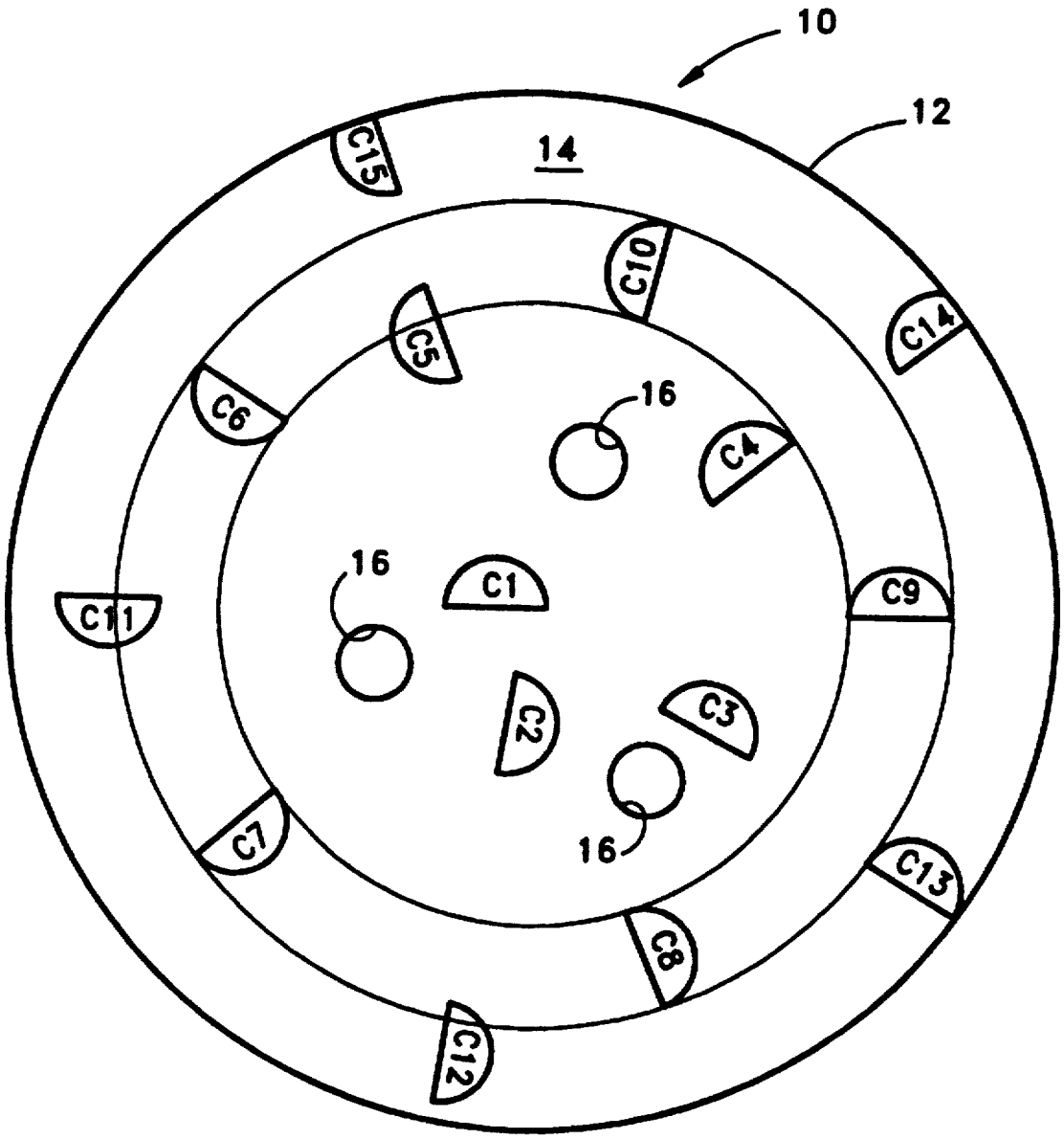
FIG. 2 is a bottom view of a lower end surface of a drill bit having a plurality of cutting elements extending therefrom in accordance with one embodiment of the present invention.

As shown in FIG. 2, a drill bit 10, such as a Geoset, PDC or Stratapak, comprises a generally cylindrical bit body 12, which on an upper end includes a pin portion with threaded or other similar connections for interconnection to a source of rotary motion, as is well known to those skilled in the art. Such source of rotary motion can include connection through a drill string to a rotary table or power swivel to the surface, or to a downhole motor or turbine. On the sides or gauge portion of the bit body 12 and a lower end surface 14, a plurality of cutting elements, hereinafter simply called cutters and labeled with a "C," extend outward. The cutters are arranged to provide material removing coverage only in a circle about a hollow inner portion if the drill bit is a "coring bit," and the cutters provide material removing coverage over the entire surface 14 if a full gauge borehole is to be created. A plurality of fluid nozzles 16 are provided on and within the bit body 12, as is well known to those skilled in the art, to provide fluid from a surface supply through the drillstring and outwardly through these nozzles 16 to wash away formation material from the cutters, as well as to cool the face of the cutters.

Figure 3:
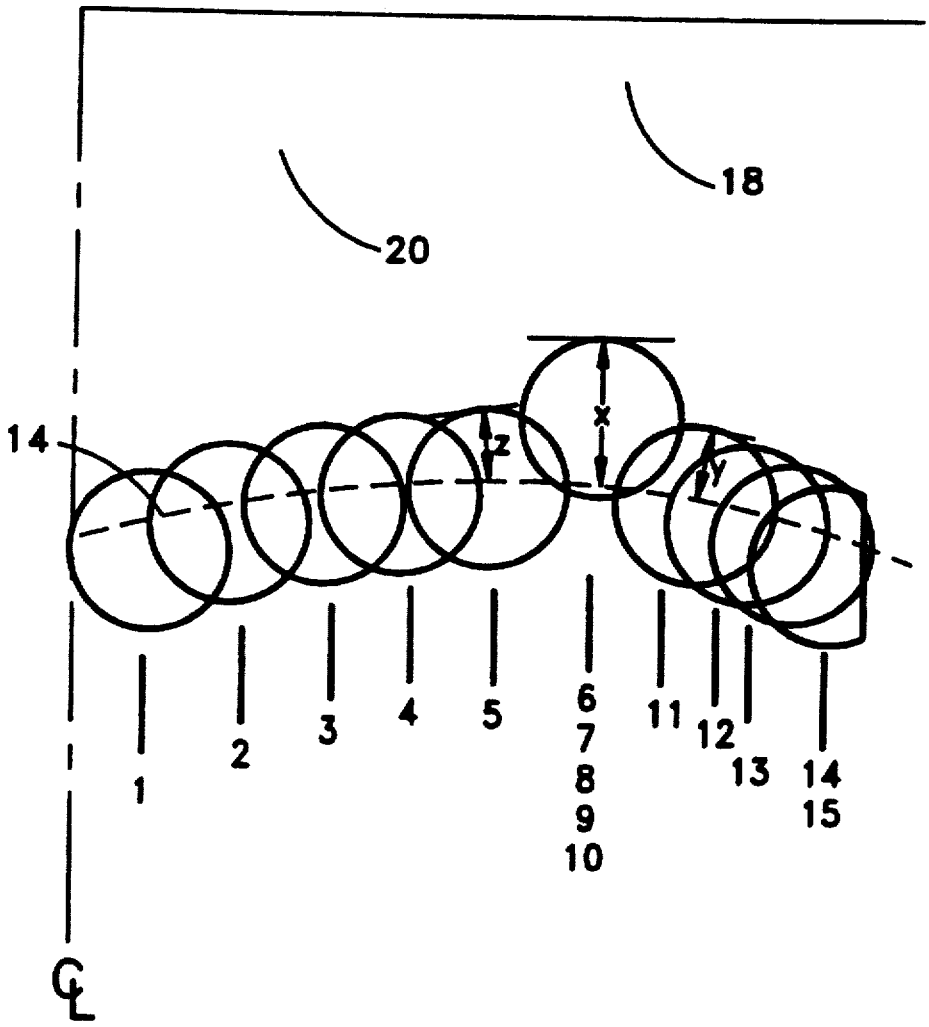
FIG. 3 is a diagramatic side view of one-half portion of the drill bit of FIG. 2, showing the cutting element profile and resulting formation material profile.

A major feature of the present invention is that one or more sets of cutters create one or more circular grooves in the formation material to prevent bit whirl, A first set of cutters, formed from at least two cutters, here labeled C-6 through C-10 in FIGS. 2 and 3, are connected to the lower end surface 14, in any known manner. The first set of cutters C-6 through C-10 are disposed at substantially an equal radius from the center axis of the bit body 12. It is preferred that the first set of cutters be of equal radius, but this is not required. The first set of cutters are also displaced around the center axis. It is preferred that the first set of cutters be equally spaced, but this is not required. In the embodiment shown in FIG. 2, there are five such cutters (C-6 through C-10) in such first set, and therefore each cutter would be at an angle of approximately 72° spaced one from another. Also, the cutters C-6 through C-10 are shown to be of the same size and side rake angles. However, the number of cutters, the relative sizes of the cutters, the back and side rake angle of the cutters can be uniform, different or in any variation desired as long as cutters in the first set of cutters simultaneously contact the edge of resulting groove 18 in material 20.

Another set of cutters (having at least two cutters therein), such as cutters C-1 through C-5, are disposed about the end surface 14 of the bit body 1 with these cutters having some overlapping radial relationship, and with at least one of these cutters, such as cutter C-5, in overlapping radial relationship with at least one cutter within the first set of cutters (C-6 through C-10). This set of cutters extending a maximum distance z out from the end surface 14.

Another set of at least two cutters, such as C-11 and C-15, are connected to the end surface 14 of the bit body 12 at a radius greater than all other cutters. These cutters have some overlapping radial relationship and at least one of the cutters (such as C-11) is in overlapping radial relationship with at least one cutter within the first set of cutters. This set of cutters extends a maximum distance y out from the end surface 14.

In the embodiment shown in FIG. 3, $x > y$; however, any configuration of sizing, back rake angle, or other arrangement of the cutters can be utilized as is desired, as long as at least one groove 18 is formed in the formation material 20. Further, y can be greater, equal or less than z, as is desired. The example shown in FIG. 3 has the cutters C-6 through C-10 residing within such groove 18 so that when the drill bit 10 is rotated, these cutters (being in substantially equal radial relationship) will ride within such groove, which tends to maintain the drill bit therewithin to prevent the drill bit 10 from whirling or wobbling about the borehole. Any force that tends to cause bit 10 to move from its centered position is resisted by an increased force in the opposite direction by one of the cutters C-6 through C-10. Thus, the gauge cutters provide a dynamically stabilizing effect only when the bit 10 tends to move from its desired centered position.

Another major feature that can be incorporated within a drill bit to assist in preventing bit whirl is to have varied side rake angles of one or more cutters. This feature can be used alone or, preferably, with the groove cutting feature described above.

For reference purposes, at side rake angle that is considered negative, the rock material is forced outwardly and away from the center of the drill bit; at a neutral side angle a straight perpendicular path is drawn from the center of the drill bit across the face of the cutter; and at a positive side angle rock material is forced towards the center of the drill bit.

Figure 4:
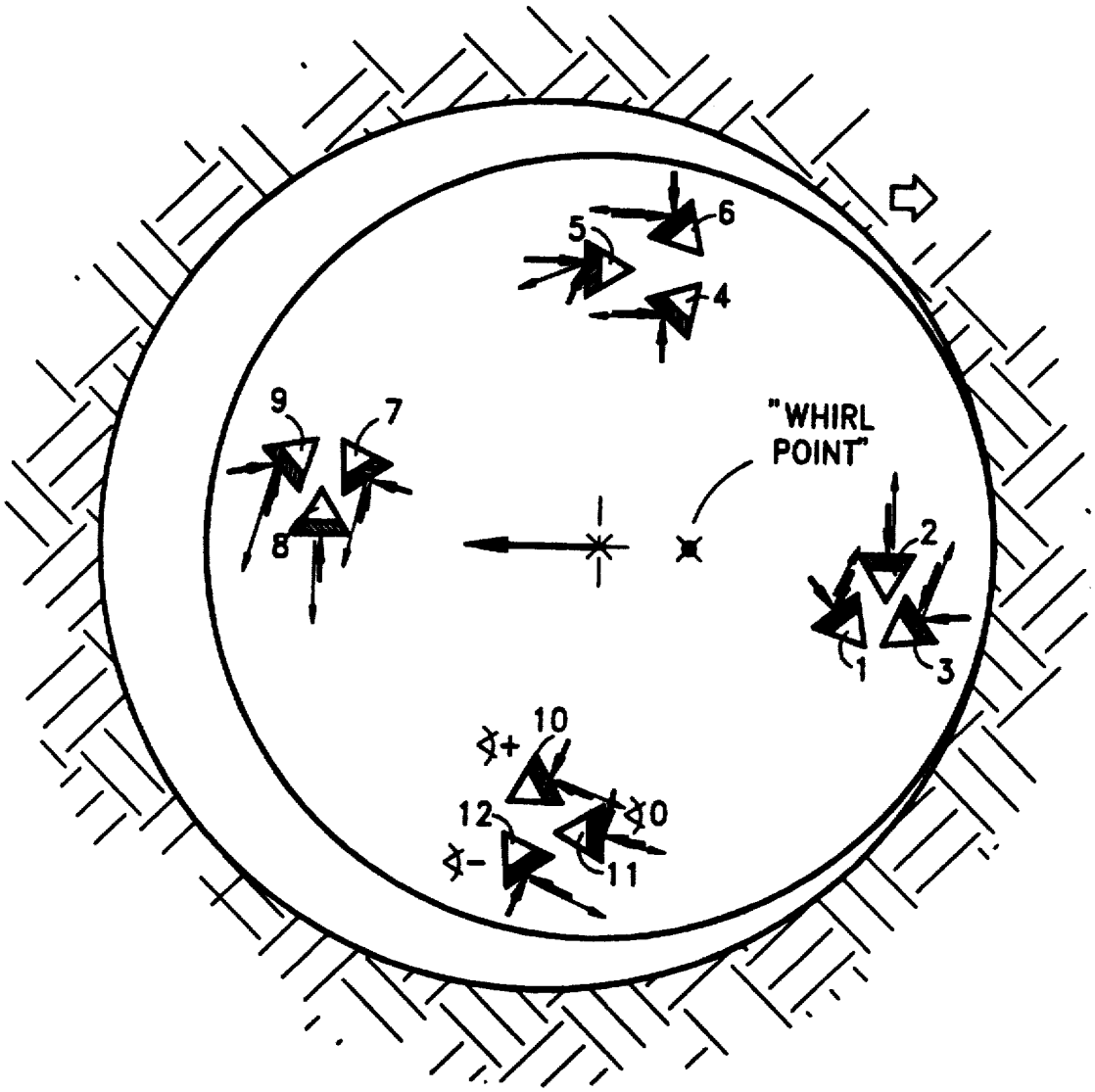
FIG. 4 is a bottom view of a lower end surface of a drill bit having a plurality of cutting elements extending therefrom in accordance with an alternate embodiment of the present invention.

As shown in FIG. 4, cutters corresponding to C-6 through C-10 in FIGS. 2 and 3 can have different, the same or varying back and/or side rake angles and varying radius. Further, in place of large single cutters, groupings of cutters can be used. Again a group of cutters should have a substantially equal radius from the center of the bit body and also each cutter group can be displaced through equal or unequal arcs around the axis. Further, the group of cutters can extend the maximum distance x from the lower end 14 of the bit body 12. In this manner, all of the cutters (C-2 through C-12 in FIG. 4) would replace cutters C-6 through C-10 in FIGS. 2 and 3.

It has been found that if positive side rake is used on the inside portion of the groove 18 and if negative side rake is used on the outside portion of the groove 18, the resulting dynamic forces tend to keep the bit 10 rotating about its center. When a sharp aggressive cutting edge is pushed laterally into the borehole surface, a high friction point is generated that can become the instantaneous center of rotation. When the bit 10 tends to move from the center of the borehole, cutters on one side of the bit 10 engage the inside of the groove 18 and cutters on the opposite side of the bit 10 engage the outside of the groove 18. By placing inside cutters with positive side rake and the outside cutters with negative side rake, the cutters have a reduced friction and have a reduced tendency to cut away the wall of the groove 18. Thus, the bit 10 has a greater tendency to be self-centering about the borehole center.

As shown in FIG. 4, cutters C-2, 5, 8 and 11 have neutral or zero side rake; cutters C-1, 4, 7 and 10 have positive side rake; and cutters C-3, 6, 9 and 12 have negative side rake. However, the arrangement can vary as desired as long as at least one cutter in an inverse radial position has positive side rake and at least one cutter in an outer radial position has negative side rake.

Wherein the present invention has been described in particular relation to the drawings attached hereto, it should be understood that other and further modifications, apart from those shown or suggested herein, can be made within the scope and spirit of the present invention.

What is claimed is:

1. A drill bit for use in rotary drilling a borehole through a material and adapted for interconnection to a source of rotary motion comprising:

a generally cylindrical bit body having a lower end surface;

a plurality of cutting elements extending outward from the lower end surface including:

at least one first set of cutters disposed at substantially an equal radius from a central axis of the bit body to create a groove in the material, the first set of cutters extending a maximum distance X from the lower end surface;

at least two cutters forming a second set of cutters in overlapping radial relationship and extending a maximum distance Z from the lower end surface, wherein X is greater than Z; and at least one of the at least two cutters in the second set being in overlapping radial relationship with at least one cutter within the first set of cutters; and at least two cutters forming a third set of cutters in overlapping radial relationship and extending a maximum distance Y from the lower end surface with Y being less than X, and at least one of the at least two cutters in the third set being in overlapping radial relationship with at least one cutter within the first set of cutters.

2. A drill bit of claim 1 wherein the second set of cutters and the third set of cutters being disposed on either side of the first set of cutters.

3. A drill bit of claim 1 wherein $x > y \geqq z$.

4. A drill bit of claim 1 wherein $x > z \geqq y$.

5. A drill bit of claim 1 wherein at least one cutter in the second set of cutters has a positive side rake angle.

6. A drill bit of claim 1 wherein at least one cutter in the third set of cutters has a negative side rake angle.

7. A drill bit of claim 1 wherein at least one cutter in the first set of cutters has a positive side rake.

8. A drill bit of claim 1 wherein the first set of cutters comprises a plurality of individual groups of cutters, with cutters within each grouping disposed in overlapping radial relationship.

9. A drill bit of claim 8 wherein at least one cutter of each grouping of cutters disposed at an inner radial position has a positive side rake angle.

10. A drill bit of claim 8 wherein at least one cutter of each grouping of cutters disposed at an outer radial position has a negative side rake angle.

*11. A drill bit for use in rotary drilling a borehole through subterranean formation material and adapted for interconnection to a source of rotary motion, comprising:*

*a generally cylindrical bit body having a lower end surface; and*

*more than one set of cutting elements extending outward from the lower end surface in substantially equal radial relationship, the cutting elements of each set in substantially equal radial relationship disposed at substantially equal radii from the center axis of the bit body for cutting one bit whirl preventing groove around the center of the borehole being drilled each groove having inside and outside cutter-engaging walls of subterranean formation material.*

* * * * *